United States Patent

[11] 3,579,180

[72] Inventor Fausto V. Taddeo
  Anaheim, Calif.
[21] Appl. No. 477,682
[22] Filed Aug. 6, 1965
[45] Patented May 18, 1971
[73] Assignee Hughes Aircraft Company
  Culver City, Calif.

[54] BEAM INTERPOLATING SYSTEM
  14 Claims, 6 Drawing Figs.
[52] U.S. Cl. ................................................. 340/3,
  340/6, 340/16, 343/113
[51] Int. Cl. .............................................. G01s 9/66
[50] Field of Search ............................................ 340/3, 6,
  16; 343/100.6, 100.7, 5 (DP), 113

[56] References Cited
  UNITED STATES PATENTS
  2,865,015  12/1958  Butz, Jr. ........................  340/3X
  2,897,351  7/1959   Melton ..........................  (340/6)
  3,144,631  8/1964   Lustig et al. ...................  340/3
  3,163,844  12/1964  Martin ..........................  340/6

Primary Examiner—Rodney D. Bennett, Jr.
Assistant Examiner—Malcolm F. Hubler
Attorneys—James K. Haskell and Walter J. Adam CLAIM: CLAIM 1. In a sonar receiving system including means for effectively forming a plurality of receiving beams, each beam representable by a composite signal comprising signals received from another azimuth range the effective centerline of each beam having an azimuth in the center of said azimuth range, said sonar receiving system further including processing and computing means for processing each composite signal to detect the range of a target having an azimuth within the azimuth range of one of said beams, an improved system for interpolating the composite signal in which a target has been detected to resolve the azimuth of the target with respect to the azimuth of the centerline of said beam comprising: means for splitting a composite signal representative of a receiving beam in which a target has been detected into a pair of signals representative of a pair of beams which are parallel to said centerline and equidistantly disposed with respect thereto; a pair of multibit delay lines, coupled to receive said pair of signals;
a plurality of analog storing units, each unit, corresponding to a different azimuth deviation with respect to the azimuth of said centerline, being coupled to two bits of said pair of delay lines; means for integrating in each of said storing units analog signals as a function of the phase correlation of signals in two different bits of said pair of delay means, the two bits having signals exhibiting a maximum phase correlation being related to the azimuth deviation of said target from the azimuth of said centerline; means for scanning said plurality of storing units to detect the unit coupled to the two bits having signals which exhibit a maximum of phase correlation; and means for providing as a function of the detected unit an output signal which indicates the azimuth deviation of the target from the azimuth of said centerline.

INVENTOR.
FAUSTO V. TADDEO,
BY J. K. Haskell
ATTORNEY.

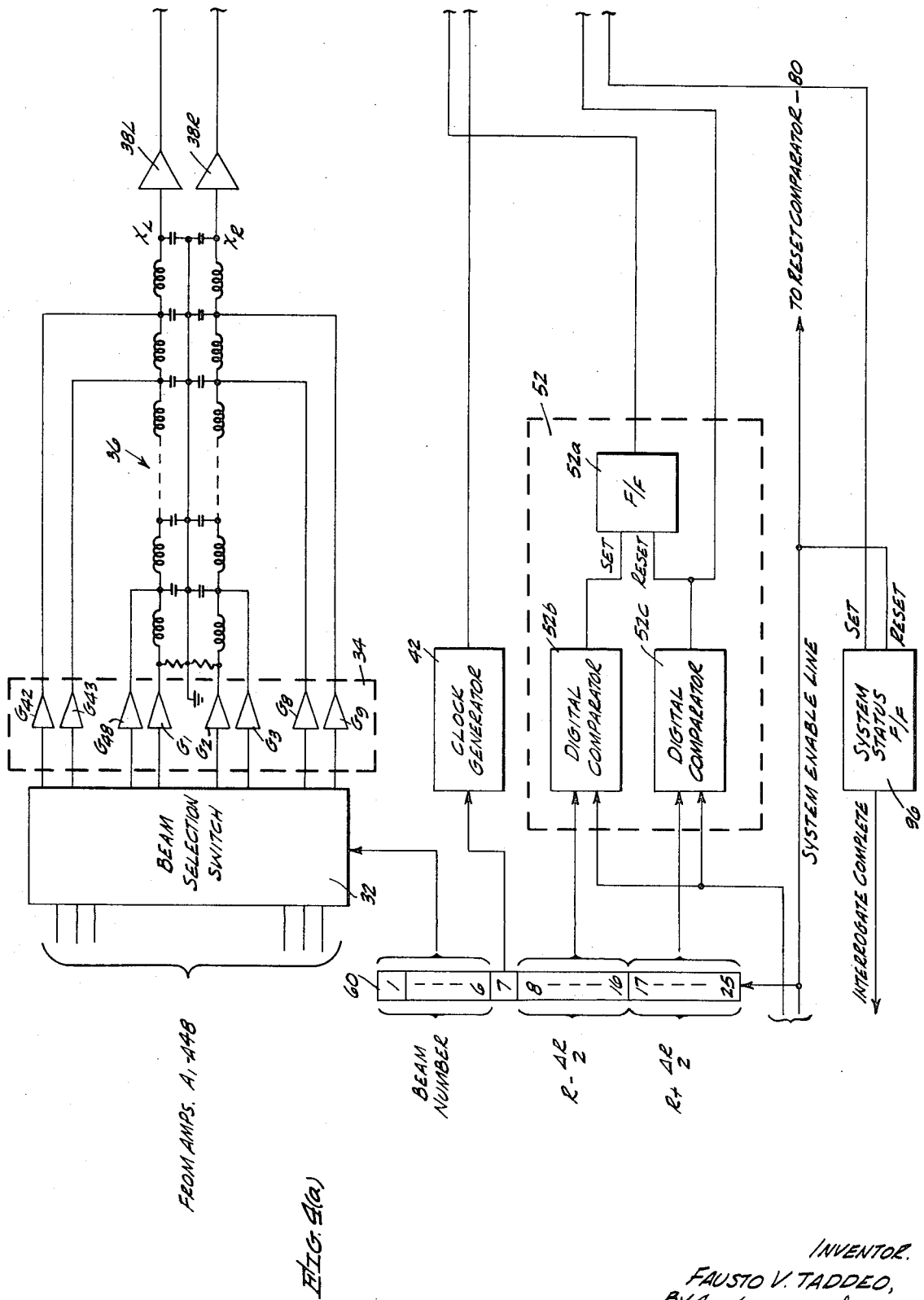

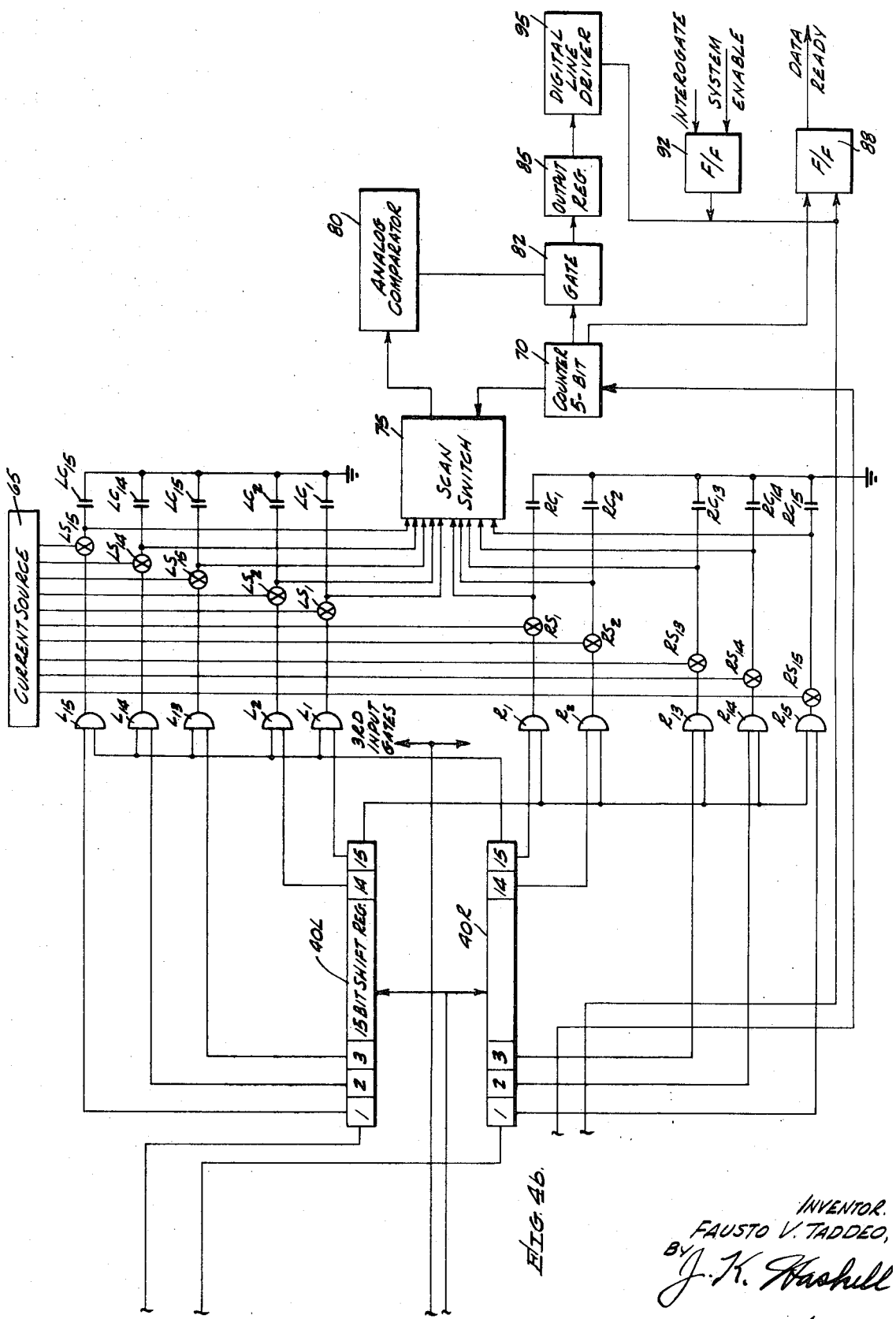

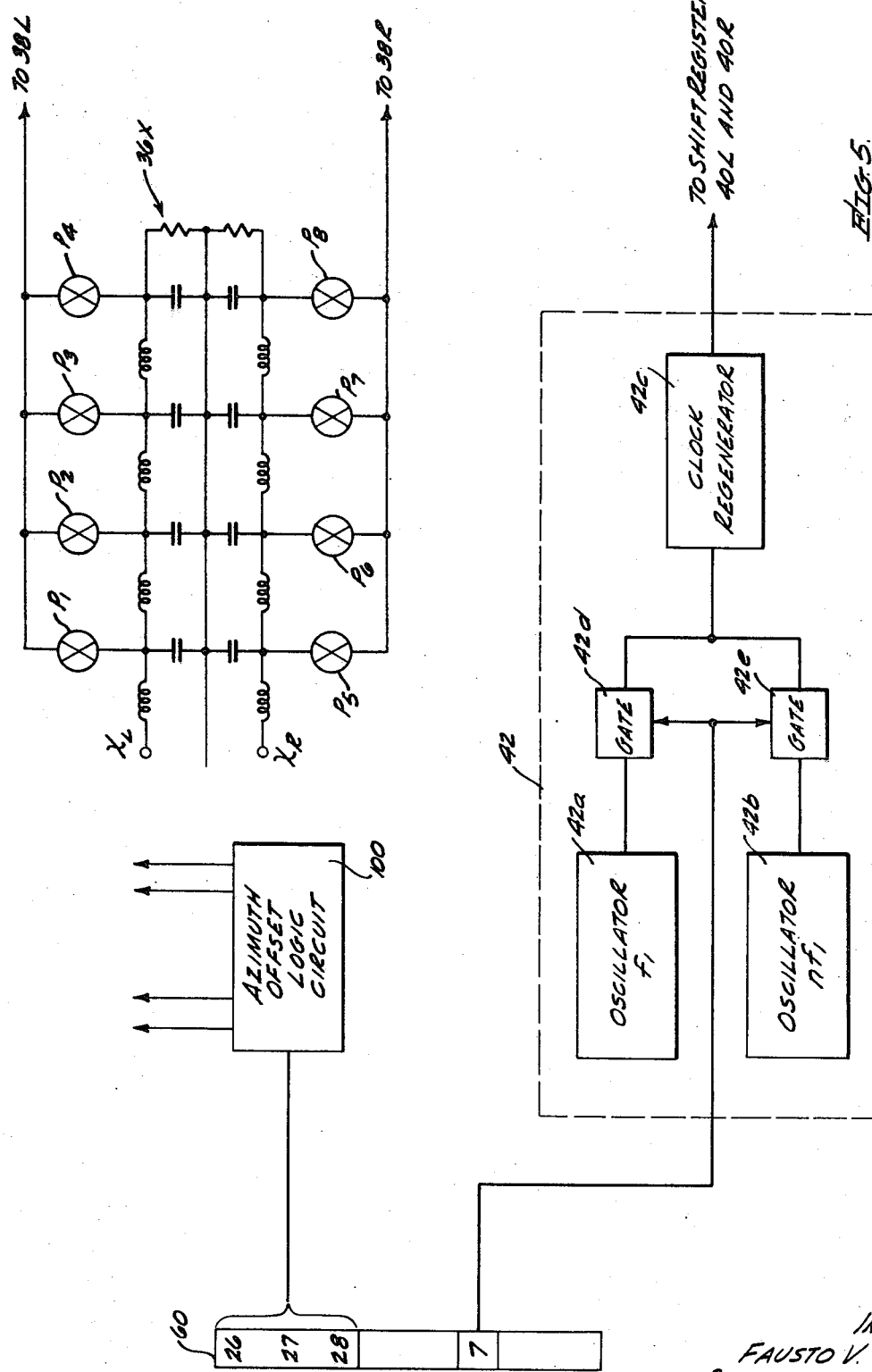

BEAM INTERPOLATING SYSTEM

This invention relates to beam or signal interpolation circuitry and more particularly to an improved system for interpolating signals received in a sonar target detection system.

In every target detection system, some technique is employed to determine the true direction and range of an unidentified target from the system by processing received signals to effectively form beam patterns. One basic technique used in the early radar or sonar systems was to derive direction or beam information by noting the relative orientation of a single antenna lobe or beam which results in a maximum signal. Since then some methods have been developed to improve the direction or bearing resolution of a target over that which can be obtained from noting the maximum signal from a single lobe or beam.

These methods, in general, are based on the derivation of an error signal or difference signal as a function of the response from two beam patterns critically oriented with respect to each other. Through the direction resolution is improved, the circuitry necessary to employ any of the methods is very complex, generally requiring multiamplification channels and phase detection circuits which must be carefully adjusted and balanced in order for the error signal to be of any valuable significance.

In one method, hereafter referred to as the amplitude method, an error signal is produced as the amplitude difference of two signals. An antenna system is used which is capable of producing two receiving patterns offset by a critical amount from a true receiving direction of a beam. The true receiving direction is accurately resolved by noting the center angle of the beams where the two signals therefrom are equal. This method is quite sensitive to any gain instability of the two amplification stages, used to amplify the signals of the two beams. Also, since measurements are not made at the maximum points on the two beams, the method can only be employed when the signal-to-noise ratio is very high.

In another method, a comparison is made of the response of two signal receivers or transducers to signals from a source at different distances from their effective centers, and noting the phase difference between the received signals resulting from the different travel time of the signals to the two receivers. The latter-described system lessens the signal-to-noise ratio limitation and the high gain stability requirements of the amplitude method. However, such a method requires either the services of a highly trained operator who interpolates the signals on the basis of the instantaneous phase angle therebetween, which are displayed on a display console, or complex correlation circuitry which performs the correlation of two signals for successively different arrival angles or directions. However, in order to perform the correlation process on signals from many different directions simultaneously, a considerable amount of storage capacity and related phase detection equipment is required. For example, with a pulse width of one section, and a carrier frequency of 8 kilocycles, nearly 3 million ($360\times8\times10^3$) bits of storage are required to realize a theoretical direction resolution of 1°. Thus, a need exists for a system which is capable of resolving target direction with great accuracy, but which is not limited by limitations characteristic of the prior art systems and methods.

Accordingly, it is an object to provide a novel signal interpolating system which is capable of providing accurate target direction resolution.

Another object is the provision of a system for accurately resolving the direction of a target, the system being less complex and sensitive than comparable prior art systems.

Yet another object of the invention is to provide a system for interpolating signals received in a target detection system to derive accurate target direction. The novel system incorporates a minimum of storage circuitry and is considerably less sensitive to small signal gain variations than prior art systems.

Still a further object is to provide a novel beam interpolating system for accurately resolving the direction of each of a plurality of targets with respect to a detection system with a minimum of relatively simple circuitry.

These and other objects of the invention are achieved by providing a system which as part of a target detection system, resolves the direction of a target which has been detected to be within a particular azimuth range by subdividing the range into a selected number of azimuth subdivisions and determining which of the subdivisions exhibits a maximum correlation when two signals related to the particular subdivision are cross correlated. Briefly, the target detection system includes an array comprising a plurality of receivers or staves. Basically, a stave may be defined as an arrangement of one or more sound wave transducers arranged in a line, generally perpendicular to the detection of the received sound wave or signal. The outputs of different stave combinations are combined to form a plurality of composite signals. Each composite signal is a function of the signals received from a different azimuth range, affected by any unidentified targets detected therein. In the following description, the composite signals will also be referred to as beams or as signals representing beams directed to different azimuth ranges, used to detect unidentified targets therein.

The composite signals or beams are supplied to a beam processor which includes a display console and a computer. An operator, viewing each composite signal or beam displayed on a display surface of the console, determines whether a target is detected in any of the displayed beams. When a target is detected, the operator, by means of control switches on the display console, energizes the computer to provide a beam number, indicating in which beam the target was detected. The computer also provides a target range number, indicating the range limits within which the target is assumed to be and an azimuth resolution number to be explained hereafter. The beam number is decoded and used to select the appropriate set of staves, the outputs of which form the composite signal or beam which looks at the target.

The outputs of the particular set of staves is supplied to the novel system of the invention which separates the composite signal into two signals which may be thought of as representing two parallel beams. Thereafter, the signal representing each beam is clipped and clocked into a multibit shift register, which is used as a signal delay device. The number of bits of both registers equals the number of the azimuth subdivisions into which each azimuth range is divided. Signals, returning from a target and combined so as to be represented by the two beams, are cross correlated by performing a bit-by-bit comparison of the contents of the two shift registers, to resolve the deviation of the direction or azimuth of the target from the center of the two parallel beams. Thus, the actual azimuth of the target is resolved with respect to the center of the two beams within one azimuth subdivision value. By varying the clocking rate of the two shift registers, the effective phase shift and therefore azimuth deviation represented by each bit may be varied to control the degree to which the actual target azimuth may be resolved.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGS. 4a and 4b are a combination schematic and block diagram of the embodiment shown in FIG. 1; and FIG. 5 is a partial diagram of another embodiment of the invention.

The novel teachings of the invention will hereafter be explained in conjunction with a sonar system for detecting unidentified targets underwater. It should be appreciated however that the specific embodiment and various values referred to hereafter should not be regarded as a limitation of the invention but rather as one example thereof.

Figure 1:
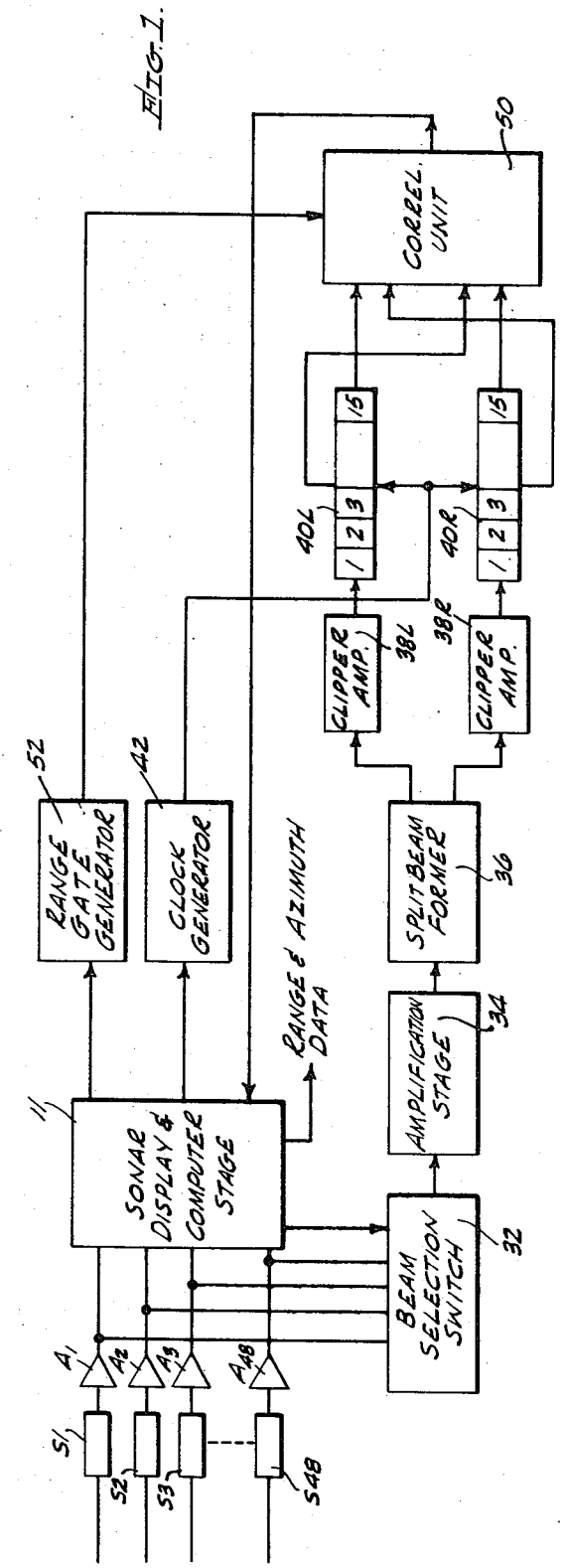
FIG. 1 is a block diagram of the novel beam interpolating system of the present invention.

Attention is now directed to FIG. 1 which is a simplified block diagram of the beam interpolator, also referred to as a beam interpolating system, of the present invention. The system used in conjunction with a sonar display and computer stage 11, hereafter also referred to as the stage 11, in a sonar receiving system. It is assumed that in the sonar receiving system which is used to provide range and azimuth data for each target detected underwater, a plurality of signal receivers or staves designated $S_1$—$S_{48}$ are arranged to simultaneously receive signals after being amplified in amplifiers $A_1$—$A_{48}$ are supplied to the stage 11. The stage is assumed to include beam forming circuitry, which combine the energy from selected sets of staves, to form a plurality of composite signals, which may be thought of as representing beams, oriented in all directions. Each composite signal or beam is processed to determine whether a target is located in the azimuth range corresponding to the beam's orientation.

In a sonar receiving system utilizing 48 staves, 48 composite signals or beams are formed, each beam having an azimuth range of 7.5°. Techniques of beam forming, whether by analog or digital means, are well known in the art and therefore will not be further explained. For explanatory purposes, it is assumed that each composite signal or beam is formed by combining the signals of a set of 16 staves. Conventionally, each composite signal or beam is processed in a receiving system, such as stage 11, to determine whether a target is located in the azimuth range of the beam. The receiving system also includes circuitry arrangements known in the art to provide range data of a detected target.

Figure 2:
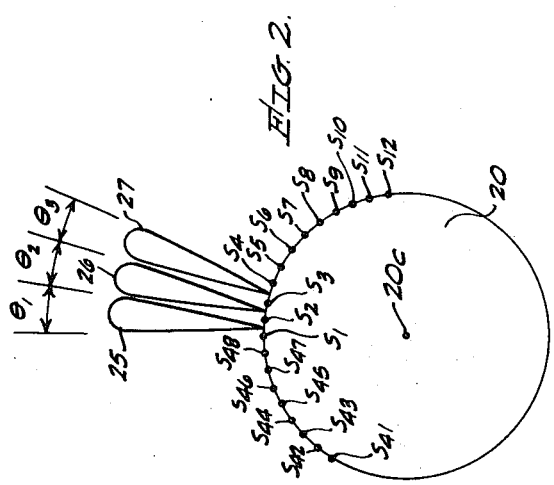
FIG. 2 is a diagram useful in explaining the formation of a plurality of beams from signals received by an array of receivers.

Referring to FIG. 2, therein is shown a receiver array 20 having staves $S_1$—$S_{48}$ distributed about a center 20c. A composite signal which may be representative of a beam 25 is formed by combining the signals received by staves $S_{42}$—$S_{48}$ and $S_1$—$S_9$, while staves $S_{43}$—$S_{48}$ and $S_1$—$S_{10}$ are used to form beam 26. Beam 27 is formed by combining the outputs of staves $S_{44}$—$S_{48}$ and $S_1$—$S_{11}$. $\theta1$, $\theta2$ and $\theta3$ represent the azimuth ranges of beams 25, 26 and 27, each range being equal to 7.5°. It is appreciated by those familiar with the art that known processing techniques may be used to analyze beam 25 in order to determined if a target is in the azimuth range $\theta1$, in which case the range of the target is derived. However in order to obtain target azimuth to a higher accuracy than that represented by the azimuth range of 7.5°, some technique must be employed to further analyze or interpolate the beam 25 in order to narrow down, or more precisely derive, the target azimuth.

According to the teachings of the present invention, this may be accomplished by producing a beam number in the stage 11 which represents the beam in which a target has been detected. Assuming that in beam 25, which is reproduced in FIG. 3 to which reference is made herein, a target T has been detected. The stage 11 will supply a beam number, related to beam 25, to a beam selection switch 32 (FIG. 1) which forms a part of the novel beam interpolating system of the present invention. The function of switch 32 is to select the appropriate set of 16 stave amplifier outputs representing the beam which looks at the particular target. In the present example, beam 25 looks at target T, so that the outputs of $A_{42}$—$A_{48}$ and $A_1$—$A_9$ are selected by switch 32 and supplied to an amplification stage 34, wherein the output of each A amplifier is further amplified and supplied to a split beam former 36.

Effectively, in the split beam former, the outputs of the 16 staves used to form the composite signals represented by beam 25, are split into two groups to form two signals. One signal is formed from the outputs of staves $S_{42}$—$S_{48}$ and $S_1$ and the other signal is formed from the outputs of staves $S_2$ through $S_9$. The two signals may be thought of as comprising or being representative of two parallel beams designated in FIG. 3 as 25R and 25L. Since each of the parallel beams is a function of the outputs of only half the number of staves used to form the composite signal representative of beam 25, each of the parallel beams is twice as wide as beam 25, i.e. 15°. The term split beam former is used to identify a circuit which divides the outputs from the 16 staves to provide two signals representative of two parallel beams. The signals represented by beams 25R and 25L are clipped by clipper amplifiers 38R and 38L respectively, the outputs of which are respectively clocked into 2 multibit shift registers 40R and 40L. The clock pulses are supplied from a clock generator which provides pulses at rates controlled by stage 11.

As seen from FIG. 1, each of the shift registers is shown comprising 15 bits. The shift registers are used as signal delay devices. Signals returning from a target which is exactly at the center of the two beams 25R and 25L designated by line 45 arrives at the inputs of the two shift registers in phase. However, as the target moves to one side, such as target T shown to the left of line 45, or the other side of the center of the two beams, the signal transit time from the target to each beam differs slightly. This difference in transit time is detected by performing a bit-by-bit comparison of the contents of the two shift registers in a correlation unit 50 and accumulating the results of each comparison in a separate analog storing stage therein.

Figure 3:
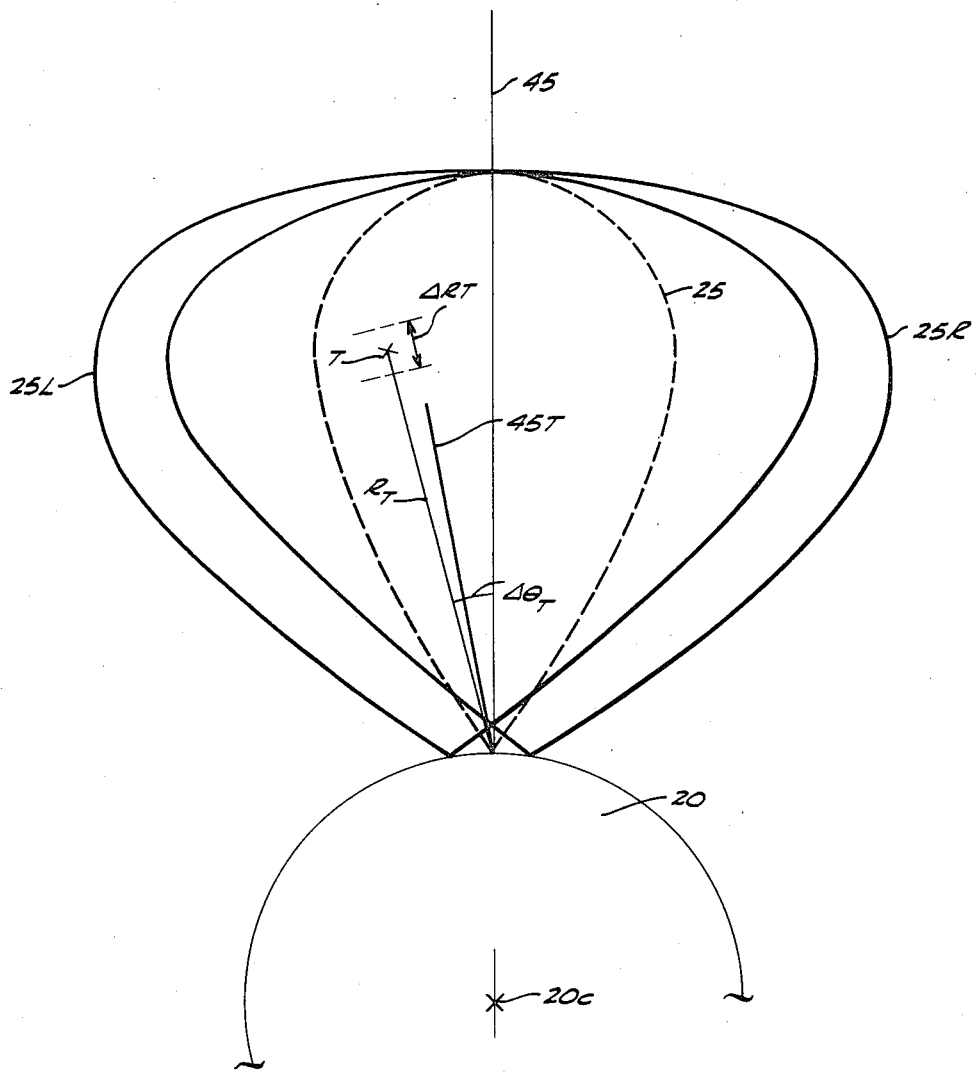
FIG. 3 is a diagram useful in explaining the split beam technique employed in the present invention.

As previously pointed out, the sonar display and computer stage 11, when analyzing beam 25, detects the target T deriving range data thereof. The range of target T is designated by line $R_T$. The stage in response to the range of target T generates a range gate $\Delta R_T$. At the start of the gate $\Delta R_T$ the stage 11, through a range gate generator 52, enables the correlation unit 50 to perform the required correlation and accumulation process which ends at the end of the range gate. Thereafter, the unit 50 is scanned, as will be explained hereafter in greater detail, to search out the analog storing stage which has a maximum value or level. Such unit represents the azimuth deviation between the center of the two parallel beams (line 45 in FIG. 3) and the actual location of the target. The azimuth deviation of target T is represented in FIG. 3 by $\Delta\theta_T$. The azimuth deviation $\Delta\theta_T$ is then transmitted to stage 11 in order to adjust the previously determined azimuth of target T which was based entirely on the azimuth range (7.5°) of beam 25.

For a more complete description of the invention, reference is made to FIGS. 4a and 4b which together comprise a combination schematic and block diagram of the novel beam interpolating system. As previously explained, the sonar display and computer stage 11, after detecting a target in any of the beams, such as beam 25, supplies a beam number to actuate beam selection switch 32. The stage 11 also supplies range gate signals to range gate generator 52, in order to control the correlation unit 50 to perform the comparisons of signals received during a range gate $\Delta R$ from a target at a range R. In FIG. 4a, a multibit register 60, which is assumed to be part of the output of stage 11, is shown connected to the various circuits of the system. Six bits (1–6) of the register are used to control the beam selection switch 32 so that the outputs of an appropriate set of 16 staves are used to form the two signals represented by the two parallel beams. For beam 25, the outputs of staves $S_{42}$—$S_{48}$ and $S_1$—$S_9$, after amplification in the related A amplifiers (FIG. 1), are supplied to amplifiers $G_{42}$—$G_{48}$ and $G_1$—$G_9$ of the amplification stage 34. The G amplifiers, each of which has a very high output impedance, are designed to minimize phase shift over the frequency range of interest, since any variation in phase shift among these amplifiers directly contributes to error in the desired azimuth resolution.

The outputs of the 16 G amplifiers are supplied to the split beam former 36 which, in FIG. 4a, is shown comprising a multitap analog delay line, each tap being connected to the output of another of the G amplifiers. The two portions of the delay line 36 must be matched so that any phase shift which occurs in one portion will also occur in the other. The technique of splitting a beam into two parallel beams, by employing an analog delay line, is presented as one example for forming the parallel beams 25R and 25L (see FIG. 3). It should be appreciated that some other beam splitting technique may similarly be employed.

The locations for the outputs of the G amplifiers on the delay line 36 are selected for zero phase error at the nominal value of sound propagation velocity. Since this propagation velocity undergoes slight changes due to environmental variations as well as apparent changes due to own ship's motion, some beam forming distortion will necessarily occur. These errors will exhibit themselves by slightly altering the shape of the preformed receiving beams. However, since only phase comparison is made between the two signals received in the two beams, interpolator accuracy is not affected.

The two signals at the outputs of the two portions of delay line 36 are supplied to clipper amplifiers 38L and 38R which clip the signals at the output of the split beam former 36. The clipped signals are clocked into the registers 40L and 40R and progress down each register at a uniform rate. The rate of progress is a function of the rate of the outputs' pulses of generator 42, which is in turn controlled by the stage 11 through the 7th bit of register 60. In the present embodiment of the invention, it is assumed that the rate of clock pulses from generator 42 is fixed at $f_1$ pps.

As seen from FIG. 1, shift registers 40L and 40R are connected to the correlation unit 50. In FIG. 4b, unit 50 is shown comprising 30 correlation gates designated $L_1$—$L_{15}$ and $R_1$—$R_{15}$. The 15th bit of register 40R and one of the bits of register 40L are connected to another of gates $L_1$—$L_{15}$. Similarly, the inputs of another of gates $R_1$—$R_{15}$ are connected to the 15th bit of 40L and one of the bits of register 40R. A third input of each gate is connected to a flip-flop (FF) 52a of the range gate generator 52. Each of the gates may be thought of as a correlation gate in that an enabling or "On" output is supplied therefrom when the same signals are present in the inputs thereof connected to the registers 40L and 40R. However, for simplicity, the gates are diagrammed as AND gates.

Each of the correlation gates is associated with an analog switch and an analog storing unit, which is diagrammed as a capacitor connected between ground potential and its respective analog switch. Thus gates $L_1$—$L_{15}$ are associated or coupled to switches $LS_1$—$LS_{15}$ respectively, which are in turn connected to storing units $LC_1$—$LC_{15}$. Similarly gates $R_1$—$R_{15}$ are coupled to switches $RS_1$—$RS_{15}$ which are connected to storing units $RC_1$—$RC_{15}$. Each of the switches is connected to a current source 65. The function of each gate and switch associated with another storing unit is to control the supply of charging current to the capacitor. Charging current is supplied from source 65 to a capacitor to increase the voltage thereacross only when its respective analog switch is enabled. This happens only when the respective correlation gate is enabled or "on" as a result of the same signals being present on both of its inputs which are connected to the two shift registers.

If the target is exactly in the center of the two parallel beams (line 45 in FIG. 3), the signals within the shift registers will be in phase. Thus, corresponding pairs of bits such as, for example, bits 15 in registers 40L and 40R will always be in the same state. Consequently, gates $L_1$ and $R_1$ will be enabled to in turn enable switches $LS_1$ and $RS_1$ respectively. As a result, the charge or voltage cross $LC_1$ and $RC_1$ will increase. It is appreciated that only one of gates $L_1$ or $R_1$ and the circuitry associated therewith is necessary. However, the two arrangements are shown to simplify the description of the invention.

From the foregoing, it is thus seen that each analog storing unit or capacitor serves as an accumulator of all the comparisons made between the two shift register bits associated therewith. The capacitor charges up to a final value, which is proportional to the degree of phase correlation of the signals in the 2 bits. A target which slightly deviates from the center axis of the two parallel beams will not cause the maximum correlation accumulation product to be stored for corresponding pairs of bits since the signal in corresponding pairs will be out of phase. The maximum correlation product, however, will always occur for a unique pair of bits in the upper and lower registers.

As previously indicated, the function of the beam interpolating system of the invention is to resolve, by beam interpolation, the azimuth of target such as T (FIG. 3) detected by stage 11 in a particular beam, such as beam 25. When detecting the target, the target range R is derived by stage 11. This range is then used to control the interpolating system to produce signal comparisons only during the interval of range gate $\Delta R$. Namely, the comparisons are limited to a period during which signals are expected from a range of $$R - \frac{\Delta R}{2}$$

to a range $$R + \frac{\Delta R}{2}.$$

In order to control the start and end of the comparison operation, to be limited to the period of the particular range gate, the system includes two digital comparators 52b and 52c which form part of the range gate generator 52. Nine bits (8 through 16) of register 60 are used to supply comparator 52b with the lower range limit $$R - \frac{\Delta R}{2}$$

of the range gate, and another 9 bits (17 through 25) are used to supply comparator 52c with the upper range limit $$R + \frac{\Delta R}{2}$$

of the range gate. Also the two comparators are provided with the output of a range counter which is part of stage 11 (FIG. 1).

When the two inputs to comparator 52b are equal, i.e. the lower limit of the range gate is reached, comparator 52b sets FF 52a to enable all the correlation gates $L_1$—$L_{15}$ and $R_1$—$R_{15}$, so that the results of the comparison of the signals of each pair of bits is accumulated. At the end of the range gate, i.e. at a time corresponding to $$R + \frac{\Delta R}{2},$$

comparator 52c resets FF 52a to disable the gates, thereby completing the accumulation of the comparisons. The latter may also be thought of as the end of the correlation integration process.

The output signal of comparator 52c which resets FF 52a is also supplied to a counter (5-bit) 70 which drives a scan switch 75 connected across each of the analog storing units $LC_1$—$LC_5$ and $RC_1$—$RC_{15}$. The switch 75 sequentially directs the voltage, which is an analog signal or sample across each of the storing units to an analog comparator 80. Comparator 80 compares the magnitude of the voltage from each storing unit with the magnitude of the voltage from the preceding unit. If the magnitude of the voltage is smaller than the voltage from a preceding unit, no further action occurs. However, if the magnitude of the voltage is greater than that from the preceding unit, then the analog comparator stores the greater voltage magnitude. At the same time, it also enables a gate 82, so that the contents or number of the counter 70 is shifted into an output register 85. In this way the output register 85 always contains the counter number corresponding to the analog storing unit in which the largest voltage or analog signal is stored. This number will be present in the output register when counter 70 completes its cycle, at which time it supplies a cycle complete signal to set a flip-flop 88. When the latter flip-flop is set, it supplies a data ready signal to the stage 11 (FIG. 1), indicating that the storing units have been scanned and that the number corresponding to the unit with the largest voltage signal is in register 85.

When the stage 11 is ready to accept such data, an interrogate signal from stage 11 sets a flip-flop 92 which activates a digital line driver 95 to transfer the content of output register 85 to the stage 11. This content represents the azimuth deviation of the detected target from the center line of the two parallel beams. The resolution of the azimuth deviation is a function of the rate $f_1$ of the clock pulses, since each clock pulse represents a 1-bit phase shift.

When FF 92 is set, it resets FF 88 and sets a system status FF 96 which supplies an interrogate complete signal to stage 11, indicating that the system is ready to interpolate the azimuth of another target. Depending on the operation of the stage 11, when it is in condition to interpolate another beam, it supplies a system enable signal which resets FF 96, as well as the analog comparator by discharging the highest voltage reading stored therein from the previous interpolation operation. The system enable signal also resets FF 92.

From the foregoing, it should be appreciated by those familiar with the art that by dividing the composite signal represented by a receiving beam (such as beam 25) into two signals represented by two parallel beams (such as 25L and 25R) and clocking the two signals into the two shift registers (40L and 40R), the azimuth of a target (such as T) may be accurately resolved, by determining the azimuth deviation of the target from an azimuth defined by the center line common to both beams (such as line 45). From FIG. 3, it is apparent that signals from target T which is to the left of center line 45 will arrive at the beam 25L prior to arriving at beam 25R. Assuming that the azimuth deviation $\Delta\theta_T$ is 2° and that the shift registers are clocked at $f_1$ so that a 1-bit phase shift corresponds to 0.5° azimuth range that it is appreciated that the signals in the 11th bit of shift register 40L and the 15th bit of register 40R will be in phase. Thus, unit $LC_5$ will exhibit the largest analog signal, so that the number corresponding to it will be supplied from output register 85 to the computer stage 11. It should be appreciated that as long as the clocking rate of the shift registers is fixed the azimuth range which is represented by 1-bit phase shift is fixed. Thus, in the foregoing, the azimuth resolution accuracy of the system is limited to 0.5°.

In another embodiment of the present invention the system includes additional circuitry, which enables the system to interpolate a beam in either of 2 incremental azimuth ranges. In either case, the system divides the azimuth range into 30 increments. Initially, after target detection the stage 11 will control the system to coarsely interpolate the target azimuth such as within ±0.5°. Thereafter, the azimuth range represented by each increment is reduced, so that the final azimuth of a target could be resolved to a higher degree of accuracy.

For a more complete description of the invention, reference is made to FIG. 5 which is a partial block diagram of circuitry required to resolve target azimuth within either of two levels of accuracy. As previously explained, the stage 11 controls the clock generator 42 through bit 7 of register 60. The generator is shown comprising a pair of oscillators 42a and 42b connected to a clock regenerator 42c through gates 42d and 42e respectively. The output of clock regenerator 42c is used to clock the shift registers 40L and 40R. The oscillators 42a and 42b generate signals at rates $f_1$ and $nf_1$ respectively so that the rate at which the shift registers are clocked depends on which one of the gates 42d and 42e is enabled. These gates are controlled by the signal from the stage 11. Thus, a 1st bit such as a "one" may be used to enable gate 42d so that the clocking rate is $f_1$ while a 2nd bit or a "zero" enables gate 42e to increase the clocking rate to $nf_1$.

In addition to controlling the clocking rate of the shift registers, in the present embodiment of the invention, the system includes a beam offsetting delay line 36x which is interposed between end terminals $X_L$ and $X_R$ of the split beam former 36 and the clipping amplifiers 38L and 38R. Switches $P_1$—$P_4$ connect four tap points of one portion of the line 36x to amplifier 38L and switches $P_5$—$P_8$ connect four other tap points of the other half of the line 36x. The switches are controlled by an azimuth offset logic circuit 100, which is in turn energized with signals supplied from the stage 11 through bits 26, 27 and 28 of register 60. The time delay between tap points for these switches is selected so that the signals of the two parallel beams (25L and 25R) can be offset from beam center (line 45) by ±4.5° in 1.5° steps.

The complete system can now be described in connection with the following example. Let us assume that in beam 25, target T is detected by stage 11 to be at a range $R_T$. To resolve its azimuth, the beam interpolating system is enabled. A beam number 25 is supplied to beam selection switch 32 which supplies the outputs of an appropriate set of staves ($S_{42}$—$S_{48}$, $S_1$—$S_9$) to form beam 25L and 25R in beam former 36. At the instance of the lower range limit $$R_T - \frac{\Delta R_T}{2}$$

FF 52a [FIG. 4a] is set enabling the correlation gates, which initiate the correlation integration process. At the same time, clock generator 42 clocks the shift registers at the lower $f_1$ frequency. Assuming that the rate is such that each bit phase shift is related to 0.5° azimuth, and that $\Delta\theta_T$ (FIG. 3) is 2°, then $LC_5$ will exhibit the highest voltage. At the end of the range gate $$\left(R_T + \frac{\Delta R_T}{2}\right),$$

FF 52a will be reset terminating the correlating integration process and initiating the scanning of the various storing units (LC and RC) to find the one with the highest voltage which in the present example is $LC_5$. The number related thereto will then be supplied from register 85 through driver 95 to the stage 11, indicating that the azimuth $\Delta\theta_T$ of target T is 2° to the left of center line 45, within an accuracy of 0.5° which is the azimuth range of 1 azimuth subdivision.

To obtain a higher resolution accuracy such as, for example 0.1°, the system is again enabled. The generator 42 is enabled to clock the shift registers at a frequency $nf_1$ where $n$ is 5 since the accuracy has been increased from 0.5° to 0.1°. Also a pair of switches from switches $P_1$—$P_8$, such as $P_3$ and $P_8$, are selected to insert fixed delays in the signals from the beam former 36 to the clipper amplifiers 38L and 38R in order to offset the signals by 1.5° to the left of the center line 45. Thus, effectively switches $P_1$—$P_8$ and the azimuth offsetting delay line 36x offset the signals of the two beams to be centered about line $45_T$. The offset signals are clocked into the registers 40L and 40R at a rate $nf_1$ so that the azimuth deviation of the target T about line $45_T$ may be determined to be within 0.1°.

As previously described in detail, the azimuth of the target is resolved by performing a correlation integration during a time period during which signals from the range of the target $$\pm \frac{\Delta R}{2}$$

are expected to be received. This is accomplished by enabling the analog correlation unit 50 at $$R_T - \frac{\Delta R_T}{2}$$

and disabling it at $$R_T + \frac{\Delta R_T}{2}.$$

Thus, it should be apparent that the interpolating system may be used to resolve the azimuth of any number of targets during a single sonar scan, provided the targets do not overlap in range. Furthermore, the azimuth of each target can be resolved within either degree of accuracy (0.5° or 0.1°) by controlling the signal supplied from stage 11 to the clock generator 42.

From the foregoing, it should be appreciated that the use in the present invention of 2 multibit shift registers, in the novel arrangement hereinbefore described, greatly reduces the storage capacity, necessary to interpolate a beam in order to resolve the azimuth of a detected target. Two 15-bit shift registers are used to subdivide an azimuth range into 30 subdivisions or increments. Furthermore, the azimuth range such as 0.5° or 0.1° corresponding to each increment is controllable. It is a function of the rate at which signals are clocked into the registers.

There has accordingly been shown and described herein a novel beam interpolating system for resolving the azimuth of a target, detected to be within an azimuth range which is related to a received beam. It should be appreciated that those familiar with the art may make modifications in the specific arrangements hereinbefore described without departing from the true spirit of the invention. Therefore, all such modifications and equivalents are deemed to fall within the scope of the invention as claimed in the appended claims.

I claim:

1. In a sonar receiving system including means for effectively forming a plurality of receiving beams, each beam representable by a composite signal comprising signals received from another azimuth range the effective center line of each beam having an azimuth in the center of said azimuth range, said sonar receiving system further including processing and computing means for processing each composite signal to detect the range of a target having an azimuth within the azimuth range of 1 of said beams, an improved system for interpolating the composite signal in which a target has been detected to resolve the azimuth of the target with respect to the azimuth of the center line of said beam comprising:

means for splitting a composite signal representative of a receiving beam in which a target has been detected into a pair of signals representative of a pair of beams which are parallel to said center line and equidistantly disposed with respect thereto;

a pair of multibit delay lines, coupled to receive said pair of signals;

a plurality of analog storing units, each unit, corresponding to a different azimuth deviation with respect to the azimuth of said center line, being coupled to 2 bits of said pair of delay lines;

means for integrating in each of said storing units analog signals as a function of the phase correlation of signals in two different bits of said pair of delay means, the 2 bits having signals exhibiting a maximum phase correlation being related to the azimuth deviation of said target from the azimuth of said center line;

means for scanning said plurality of storing units to detect the unit coupled to the 2 bits having signals which exhibit a maximum of phase correlation; and means for providing as a function of the detected unit an output signal which indicates the azimuth deviation of the target from the azimuth of said center line.

2. In a sonar receiving system wherein a target is detected in a receiving beam comprising signals received from a particular azimuth range, an improved beam interpolating system for resolving the azimuth of said target by providing an output signal indicative of the deviation of the azimuth of said target from the azimuth of a center line of said beam comprising:

means for forming signals representative of said receiving beam split into two beams parallel to said center line and equidistantly disposed with respect thereto;

two multibit delay lines each line coupled to receive signals of another of said two parallel beams; and correlation means coupled to the two delay lines for correlating the phase of the signals of said two beams on a bit-by-bit comparison to provide an output signal which indicates the deviation of the azimuth of said target from the azimuth of the center line of said beam.

3. The system of claim 2 wherein said correlation means include:

a plurality of storing units;

means for coupling 2 bits each of another of said delay lines to each storing unit;

first means for controlling the storing of signals in each storing unit as a function of the phase correlation of the signals in the 2 bits coupled to said storing unit, the relationship of the phases of said signals being related to the deviation of the azimuth of said target with respect to the azimuth of said center line; and second means for sequentially scanning said storing units to provide said output signal as a function of the storing unit having a maximum of signals stored therein.

4. The system of claim 3 wherein each of said 2 multibit delay lines comprises a multibit shift register said system including clock pulse generating means for providing clock pulses at a selected rate; and means for energizing the two shift registers with said clock pulses to clock the signals of said two parallel beams into said registers at said selected rate, the time required for signals to advance 1 bit in one of said registers representing a predetermined azimuth deviation from the azimuth of said center line.

5. The system of claim 4 further including:

range gate generating means responsive to range gating signals from said sonar receiving system for controlling said analog correlation means to store signals in said storing units only during a predetermined period related to the range of said target from said sonar receiving system.

6. The system of claim 5 wherein said range gate generating means include means for enabling said correlation means to store signals in said storing means when said receiving system receives signals from a range $$R_T - \frac{\Delta R}{2},$$

$R_T$ being the detected range of said target and $\Delta R$ being a selected incremental range portion, said range gate generating means include means for disabling said correlation means when said sonar receiving system receives signals from a range $$R_T + \frac{\Delta R}{2}.$$

7. In combination with a sonar receiving system wherein received signals are combined to form a plurality of composite signals representative of a plurality of beams, each beam being representable by signals received from another azimuth range, the system including processing and computing means to process each beam and detect a target having an azimuth within the azimuth range of the particular beam, said system further providing a signal indicative of the range of the detected target, a signal interpolating system for resolving the azimuth of the detected target within said azimuth range with respect to the azimuth of a center line of said beam comprising:

first means responsive to the signals received from another azimuth range for forming a pair of signals representative of a pair of beams parallelly aligned with the center line of the beam representable by the signals received from said azimuth range and equidistantly disposed with respect thereto;

a pair of multibit shift registers each coupled to said first means to receive another of said pair of signals;

means for clocking said pair of signals into said pair of shift registers at a predetermined rate, the time required for a signal to advance in one of said registers by 1 bit corresponding to a phase shift between related signals of said pair of beams received from a target which has an azimuth deviating by a selected azimuth increment from the azimuth of said center line;

correlation means coupled to each of the bits of said pair of shift registers for correlating the phase of the signals in different pairs of bits and detecting the pair of bits having signals with a maximum phase correlation; and output means responsive to the pair of bits having signals with the signals with the maximum phase correlation for providing an output signal which represents the azimuth deviation of the azimuth of said target from the azimuth of said center line, the accuracy of said selected azimuth increment which is a function of the rate signals are clocked in said shift registers.

8. The combination of claim 7 wherein said correlation means include a plurality of analog storing units, each unit being coupled to another pair of bits of said pair of shift registers for accumulating analog signals as a function of the phase correlation of the signals in said pair of bits, the magnitude of the analog signals accumulated during a predetermined period in each of said units being related to the correlation product of the pair of bits coupled thereto in said pair of shift registers and the actual azimuth deviation of the azimuth of said target with respect to the azimuth of said center line, and said output means including means for scanning said plurality of storing units and detecting the unit storing analog signals having a maximum magnitude to provide said output signal which represents the azimuth deviation of the azimuth of said target from the azimuth of said center line.

9. The combination of claim 8 wherein said signal interpolating system further includes range gate means for controlling the accumulation of said analog signals to a predetermined period which is related to a period during which said sonar receiving system receives signals from sources located between ranges $$R_T - \frac{\Delta R}{2}$$

and $$R_T + \frac{\Delta R}{2},$$

where $R_T$ is the detected range of said target and $\Delta R$ is a predetermined range interval.

10. The combination of claim 7 wherein said signal interpolating system further includes means for controlling said means for clocking whereby signals are clocked into said shift registers at one of a plurality of selected rates to control the azimuth increment represented by the time required for a signal to advance in either of said shift registers by 1 bit.

11. The combination of claim 10 wherein said correlation means include a plurality of analog storing units, each unit being coupled to another pair of bits of said pair of shift registers for accumulating analog signals as a function of the phase correlation of the signals in said pair of bits, the magnitude of the analog signals accumulated during a predetermined period in each of said units being related to the correlation product of the pair of bits coupled thereto in said pair of shift registers and the actual azimuth deviation of the azimuth of said target with respect to the azimuth of said center line, and said output means including means for scanning said plurality of storing units and detecting the unit storing analog signals having a maximum magnitude to provide said output signal which represents the azimuth deviation of the azimuth of said target from the azimuth of said center line.

12. The combination of claim 11 wherein said signal interpolating system further includes range gate means for controlling the accumulation of said analog signals to a predetermined period which is related to a period during which said sonar receiving system receives signals from sources located between ranges $$R_T - \frac{\Delta R}{2}$$

and $$R_T + \frac{\Delta R}{2},$$

where $R_T$ is the detected range of said target and $\Delta R$ is a predetermined range interval.

13. The combination of claim 10 said signal interpolating system further including beam offsetting means responsive to signals of the processing and computing means of said sonar receiving system for electronically offsetting the center of said pair of beams from said center line and aligning said center with a target line directed to said detected target to resolve the azimuth of said target with respect to said target line.

14. In a target detection receiving system including a plurality of receivers, means for forming a plurality of receiving beams, each beam comprising signals received from another azimuth range and processing and computing means for deriving the range of a target detected in one of said receiving beams an improved system for interpolating said receiving beam to resolve the azimuth of said target with respect to the azimuth range of said receiving beam comprising:

means for separating the signals which comprise said beam into two signals which effectively represent two parallel beams equally spaced within respect to a center line having an azimuth which is centered in the azimuth range of one of said receiving beams;

a pair of delay means;

means for supplying said two signals which effectively comprise said two parallel beams to said pair of delay lines;

means coupled to said delay lines for correlating signals received therefrom to provide a plurality of analog signals, each analog signal being a function of the phase correlation between another set of two signals from said delay lines; and means for scanning said analog signals and detecting the analog signals related to the two signals having the highest degree of phase correlation to determine the azimuth of said target as a function of the azimuth deviation represented by said detected analog signal with respect to the azimuth represented by said center line.